United States Patent [19]

Ward, Jr.

[11] 4,298,291
[45] Nov. 3, 1981

[54] CONNECTOR CLAMP

[76] Inventor: Daniel L. Ward, Jr., 8671 Kumquat, Seminole, Fla. 33542

[21] Appl. No.: 121,466

[22] Filed: Feb. 14, 1980

[51] Int. Cl.³ .............................................. F16B 1/00
[52] U.S. Cl. .................................... 403/205; 403/231
[58] Field of Search ....................... 403/231, 205, 403; 52/239, 285; 160/351

[56] References Cited

U.S. PATENT DOCUMENTS

| | | | |
|---|---|---|---|
| 1,551,462 | 8/1925 | Broome | 52/285 |
| 2,258,574 | 10/1941 | Leary | 52/285 |
| 2,338,191 | 1/1944 | Lumm | 52/285 |
| 2,351,525 | 6/1944 | Leary | 52/285 |
| 3,284,974 | 11/1966 | Stein . | |
| 3,466,777 | 9/1969 | Wistrand et al. . | |
| 4,014,618 | 3/1977 | Kristiansen | 403/205 |
| 4,118,903 | 10/1978 | Coulthard . | |
| 4,166,332 | 9/1979 | Donovan . | |

Primary Examiner—Andrew V. Kundrat
Attorney, Agent, or Firm—Lowe, King, Price & Becker

[57] ABSTRACT

A connector clamp assembly is disclosed for use with display panels for interconnecting the panels into a composite display assembly. A clamp base fabricated of plastic includes a pair of angle members and an integral bridge that is bent in the middle to form an appropriate angle. A pair of transparent clamp angles are connected to each angle member so as to provide a channel for receipt of the edge of the display panels. Adjustable fastener means connects the angle members of the base and the clamp angles so as to allow secure clamping of the edges. The adjustable fastener includes a bolt assembly and slot formed in the clamp angle to allow convenient adjustment of the channel width receiving the panel. To provide a stacked modular display assembly, a pair of connector clamp assemblies are connected in juxtaposition providing oppositely extending channels for clamping adjacent horizontal edges of the panels.

7 Claims, 9 Drawing Figures

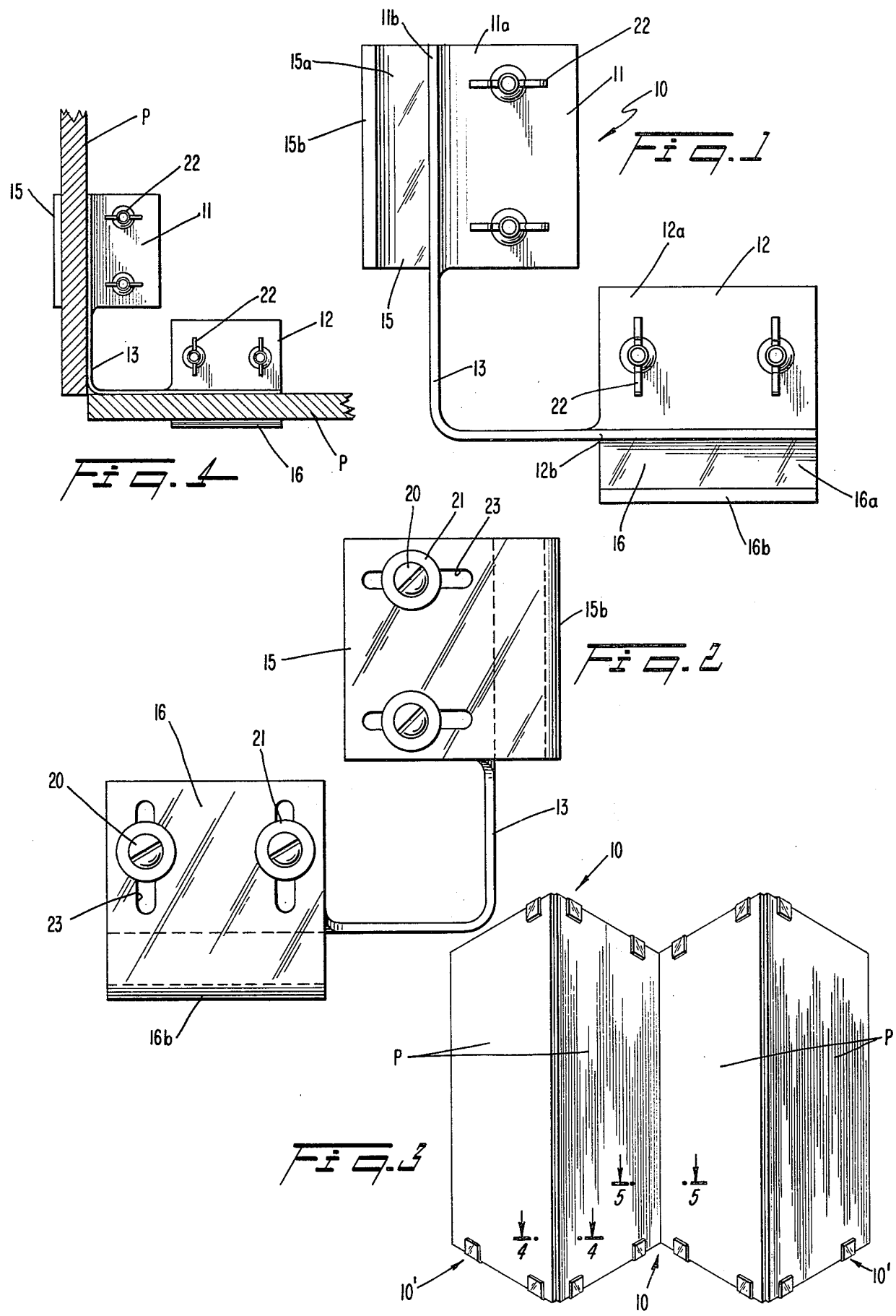

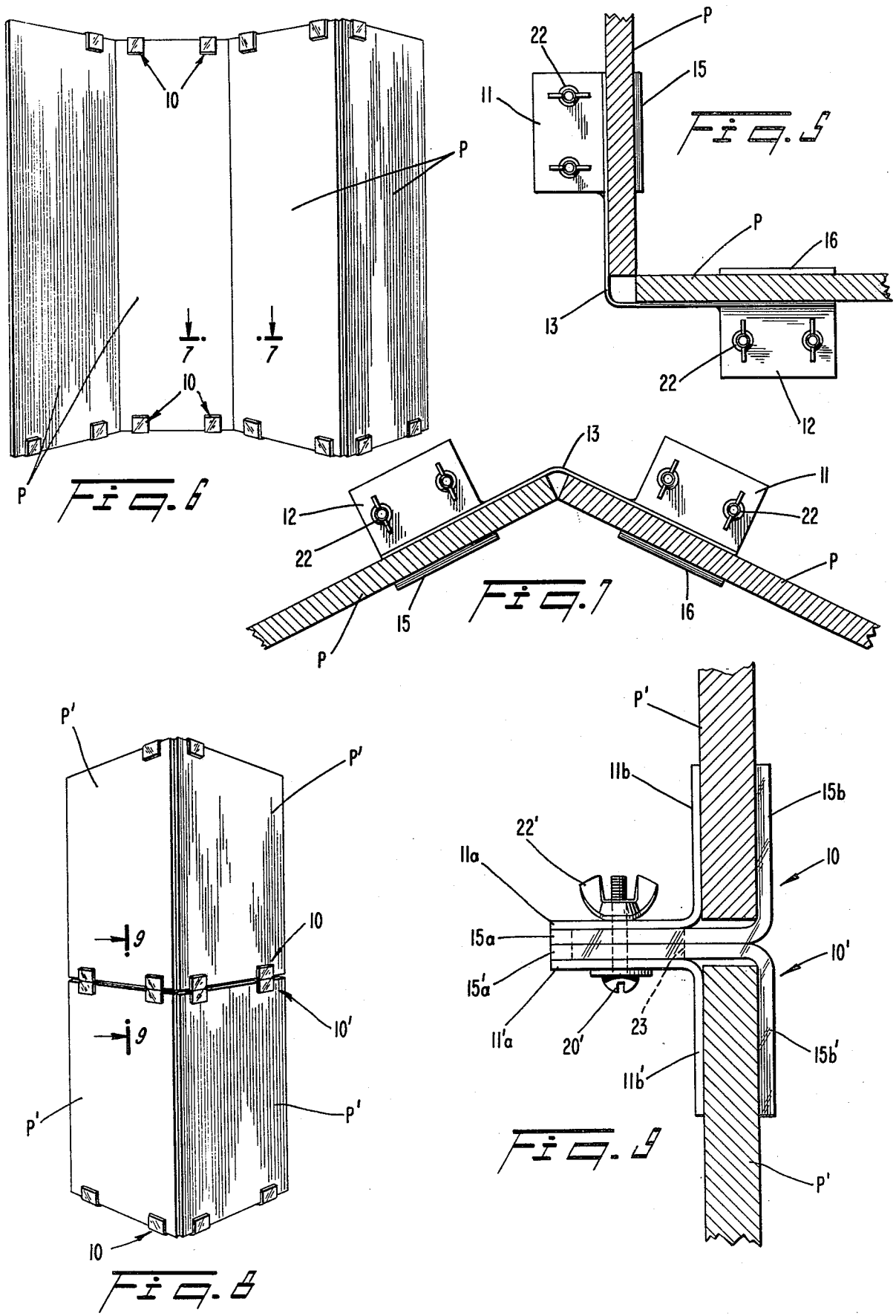

CONNECTOR CLAMP

FIELD OF THE INVENTION

The present invention relates to clamp assembly structures, and more particularly to a clamp assembly for connecting and securely supporting display panels.

BACKGROUND OF THE INVENTION

Free-standing displays including a plurality of interconnected panels are widely used in the advertising field. The displays are used on a wide scale at conventions and trade shows in order to provide an attractive background and display area for the goods and/or services that are being offered. The panels are used to mount photographs and other advertising material in addition to being brightly colored to provide the aesthetically pleasing background desired. In addition to use at conventions and shows, these displays are becoming more and more popular for public lobbies, and entry halls, as well as providing a focal point in permanent display rooms of companies or the like.

In the past, these panels have usually been interconnected by hinges that extend along the vertical edges so that the display assemblies can be folded when not in use. In these prior art devices, the panels are thus usually fixed with relation to each other so that variety of arrangement of the panels to get different color combinations or the like is not possible. Because the panels are freely hinged, in many instances the display is set up so as not to be symmetrical, or during the time that the display is in use one or more of the panels are inadvertently moved by shifting of the hinged connection. This causes the display to become unattractive and thus indirectly adversely affects the sales effort of the user. Also, the use of hinges to connect the panels is a relatively expensive way of providing the interconnection since the hinges are subjected to substantial forces and thus are made of metal.

There have been other attempts to provide free-standing displays using different devices for interconnecting the panels. However, in each instance, the connectors are still relatively high in cost, or in some cases difficult to assemble, and in still other cases do not provide the security needed for assuring the integrity of the display during use.

Thus, it is one object of the present invention to provide a new concept in connecting modular free-standing panels for advertising displays wherein interconnection by hinges or the like is eliminated.

It is another object of the present invention to provide interconnection of angled display panels by simple, low-cost connector clamp assemblies that are used in combination to make a variety of display combinations.

It is still another object of the present invention to provide a connector clamp assembly that is made of simple molded plastic parts and including an adjustable fastener arrangement to allow secure clamping of the plain panel edges.

BRIEF DESCRIPTION OF THE INVENTION

According to the present invention, a connector clamp assembly is provided for easy interconnection of plain display panels into an attractive and dramatic display assembly. The connectors are provided preferably to form 90° angles between two adjacent display panels, or an obtuse angle of approximately 135° for a more open display assembly. The connector clamp can be used to secure full-length vertical panels together, or a combination of two clamp assemblies can be used to interconnect and stack shorter or half-panels.

The clamp assembly includes a clamp base that is made up of two angle members having first and second legs normal to each other and a bridge integrally connecting the angle members along the second leg. The bridge between the angles is positioned between the vertical edges of adjacent panels in a composite display. A separate clamp angle is connected to each angle member and has corresponding first and second leg elements. The second leg and second leg element are positioned parallel to each other to form a channel that receives the edge of the panels for clamping. The first leg and first leg element are positioned in juxtaposition to secure the channel that clamps the edge of the panel. The securing function is provided by adjustable fastener means extending through the first leg element and the first leg. The clamp assembly is preferably formed of semi-rigid plastic so that the edges of the panels are secured, and yet limited flexibility is provided at the connection by suitable flexure of the bridge on the clamp base. The clamp angle is preferably transparent plastic so that the panel edge behind the second leg element is fully visible.

Preferably, the fastener means is a simple arrangement, such as a slot in one of the first legs with a bolt extending between the legs including through the slot. By movement of the slot relative to the bolt, the channel width may be varied to provide secure clamping of the panel edges when the composite display is being erected.

Another unique feature of the clamp assembly of the present invention is that a pair may be used by simple placement of the first leg elements of the clamp angles in a back-to-back relationship. This provides oppositely-extending channels for clamping adjacent upper and lower panels. In this instance, the edge-to-edge positioning is accomplished vertically, as well as horizontally. By using half-panels that are stacked, an extra dimension of display versatility can be obtained.

The clamp assemblies are preferably formed of high density polyethylene or a similar plastic. The clamp angle may be transparent, as indicated above, and for this reason, can be low-cost acrylic glazing. The plastic parts are easily fabricated by simple cutting and bending operations from sheet material that is readily available. The thickness of the plastic is preferably ¼–3/16" thick, which provides the necessary rigidity, while remaining low in cost.

BRIEF DESCRIPTION OF THE DRAWINGS

The accompanying drawings illustrate preferred embodiments of the present invention and together with the description, serve to explain the principles of the invention.

FIG. 1 is a top view of a connector clamp assembly constructed in accordance with the principles of the present invention;

FIG. 2 is a bottom view of the connector clamp assembly of the invention;

FIG. 3 is a showing of a composite display in which multiple panels are interconnected by the connector clamp assemblies of the present invention;

FIG. 4 is a cross-sectional view taken along line 4—4 showing the panels clamped at an outside right angle;

FIG. 5 is a cross-sectional view taken along line 5—5 similar to the showing in FIG. 4 except showing the panels clamped at an inside right angle;

FIG. 6 is a showing of another composite display wherein the angles of interconnection are at an obtuse angle;

FIG. 7 is a cross-sectional view taken along line 7—7 showing the inside obtuse angle of interconnection of the panels;

FIG. 8 is a composite display utilizing half-length panels, which are stacked by using a pair of connector clamp assemblies; and FIG. 9 is a cross-sectional view taken along line 9—9 showing the edges of the stacked panels being clamped.

DETAILED DESCRIPTION OF THE PREFERRED EMBODIMENT

With reference now to the drawings, a more detailed description of the preferred embodiment of the invention can be provided. A connector clamp assembly, generally designated by the reference numeral 10 includes a pair of angle members 11, 12. These angle members include a horizontal leg 11a, 12a and a vertical leg 11b, 12b (see also FIG. 9). The legs 11a, 11b are positioned at substantially 90° to each other, or normal to each other, to form a right angle support. The upstanding legs 11b, 12b are integrally connected by a bridge member 13. The angle members 11, 12 and the bridge member 13 form the clamp base of the clamp assembly 10.

Connected to the horizontal legs 11a, 12a of the angle members 11, 12 respectively are clamp angles 15, 16 that have corresponding first and second leg elements 15a, 15b and 16a, 16b (see also FIG. 9).

Each of the clamp angles 15, 16 are positioned with their first leg elements in juxtaposition, that is face-to-face contact, with the corresponding first legs 11a, 12a of the angle members 11, 12. This relationship provides an open, upwardly extending channel between the inner face of the second leg 15b, 16b of the clamp angles and the outer face of the second legs 11b, 12b of the angle members.

The first legs 11a, 15a and 12a, 16a are connected by adjustable fastener means in the form of a bolt 20, washer 21 and wing nut 22 (see FIGS. 1 and 2). When the wing nut 22 is loosened, the clamp angles 15, 16 are slidably adjustable with respect to the corresponding angle members 11, 12 by virtue of a slot 23 for each bolt 20. Preferably, the slot is formed in the first leg elements 15a, 16a, as shown in FIG. 2.

From the above description, it can be seen that the connector clamp assembly 10 of the present invention is simple in design. The clamp base including the angle members 11, 12 and the bridge member 13 are formed by cutting the entire base from a piece of sheet plastic as an integral single piece member. Localized heat is provided to make the bend at the middle of the bridge member as well as the bend that defines the legs 11a, 11b and 12a, 12b. The sheet plastic may be high density polyethylene or ABS plastic, both of which are low-cost and easily cut. These plastics are semi-rigid to allow secure clamping action, but at the same time provide limited flexibility at the connection between the panels that is afforded by the angled bridge member 13. This flexibility accommodates for slight warping or other tolerances that might be present in the panels that are to be clamped.

The clamp angles 15, 16 are preferably formed of acrylic glazing material and the bend to form the angle defining the corresponding first and second leg elements 15a, 15b and 16a, 16b may be provided by the same localized heating and bending. The acrylic glazing is transparent so that the exposed leg elements 15b, 16b do not obstruct the view when the clamp assembly is installed, as will now be described.

As best shown in FIG. 3, upstanding display panels P may be advantageously connected to form a composite display by use of six connector clamp assemblies 10. To provide the essential interconnecting function for the composite display assembly, three connector clamp assemblies 10 are provided across the top of the four-panel display and three are essential across the bottom (FIG. 3). In each location where a clamp assembly is used, an angle, in this instance a right angle, is formed between the panels P. Specifically, two outside angles between the panels P are formed and a cross-section showing the outside angle is shown in FIG. 4. The edges of the panels are brought into touching engagement adjacent the bend in the bridge member 13. The panels P are clamped in their respective positions by appropriate adjustment of the clamp angles 15, 16 relative to the corresponding angle members 11, 12 of the clamp base.

When the clamp assemblies 10 are used at the bottom of the composite panel display assembly (FIG. 3), clamp assemblies serve as supporting feet for the assembly. For this reason, two additional clamp assemblies 10' may be used on the end panels P to provide stability to the outer edges of these end panels. The clamp assemblies 10 have a broad base provided by the bottom of the first leg elements 15a, 16a of the clamp angles. Because the second leg elements 15b, 16b are transparent, there is no obstruction of the display faces of the panels P (see FIG. 3). The inside angle formed at the center of the composite panel display is formed simply by making the bend in the bridge element 13 extend in the opposite direction, as shown in FIG. 5. The panels P are clamped and securely held together at a right angle with the edge contact occurring on the inside of the clamp base but still opposite the 90° bend in the bridge member 13.

In the instance where a more open display is desired, the bend in the bridge member 13 is simply made so as to form an obtuse angle, such as the approximately 135° angle shown in FIGS. 6 and 7 of the drawings. FIG. 7 shows the formation of an inside angle between the panels P; it being understood that the outside angle is formed by the reverse bend that is analogous to the outside angle clamp assembly 10 shown in FIG. 4. Of course, any desired combination of right angled clamp assemblies and obtuse angle clamp assemblies can be used to make a composite display. Also, although the two angles shown and described are the most popular, it will be readily realized that other angles may be utilized with the inventive concept of the present invention.

A unique and important feature of the present invention is the ability to use a pair of connector clamp assemblies fastened base-to-base, i.e., with the first leg elements of the clamp assemblies in juxtaposition and providing oppositely extending channels, as shown in FIGS. 8 and 9 of the drawings. In this arrangement, the panels P' are less than full height, or basically half-panels P' so that four panels are provided securely clamped in edge-to-edge position (FIG. 8). That is, the panels P' are not only connected along the vertical or upstanding edges, but also along the horizontal edges between the panels P'. The manner in which the horizontal edges are connected, is shown in detail in FIG. 9 wherein the panels P' are seated in the oppositely directed channels provided by the legs 11b, 15b and 11b' and 15b'. The bolt 20' extends through the thicknesses of all four legs 11a, 15a and 11a', 15a'. When the wing nut 22' is securely tightened, not only is each clamp assembly 10, 10' securely clamping the panels P', but the clamp assemblies 10, 10' are securely fastened together providing the stacked panel configuration, shown in FIG. 8.

An outstanding use of the stacked panel concept in accordance with the present invention is in making a tower display. Any number of the panels P' can be stacked in modular vertical array and with four panels P' at each level, the enclosed tower is stable and secure. With the company logo on the top panel of the column, a dramatic result is obtained using the concept of the present invention.

The results and advantages of my connector clamp assembly and its use with the modular panels P or modular half-panels P' can now be realized. The clamps are relatively low-cost and provide for a highly stable, but flexible interconnection, providing any desirable composite display assembly. Since the bridge member 13 is integral with the angle members 11, 12, there are no loose parts at this critical point and thus no likelihood of the display assembly inadvertently folding up or becoming disoriented during use. The edges of the panels P are securely clamped by simply loosening the wing nut 22, inserting the panels P and then shifting the clamp angles 15, 16 so as to move the slot 23 along the bolt 20 and then tightening the wing nut 22. The clamp assemblies utilize a transparent leg element on the clamp angles 15, 16 so that there is no obstruction of the view on the panels P.

The present invention is not limited to specific details shown and described and modifications may be made without departing from the principles of this invention.

What is claimed is:

1. A connector clamp assembly for interconnecting modular display panels comprising
   a clamp base including a pair of angle members having first and second legs normal to each other, a bridge member integrally connected to the second leg of each angle member for bridging between the edges of adjacent panels;
   a clamp angle connected to each angle member, having corresponding first and second leg elements;
   said clamp angle being positioned to have said second leg element parallel to said second leg of said angle member to form a channel to receive the edge of said panel, and the first leg element being in juxtaposition to said first leg; and
   adjustable fastener means connecting said first leg element and said first leg, whereby the width of said channel may be varied to securely clamp the corresponding edge of said panel and thereby interconnect the panels.

2. The connector clamp assembly of claim 1 wherein said clamp base and said clamp angles are formed of semi-rigid plastic to provide limited flexibility at the connection between the panels.

3. The connector clamp assembly of claim 2 wherein said clamp angle is transparent plastic so that the panel edge is visible through said second leg element.

4. The connector clamp assembly of claim 1 wherein said adjustable fastener means comprises a slot in one of the juxtaposed first leg and first leg elements and bolt means extending therebetween including through said slot, whereby the channel width may be varied by movement of said bolt means along said slot.

5. The connector clamp assembly of claim 1 wherein said bridge member includes a 90° bend positioned at the edges of the adjacent panels.

6. The connector clamp assembly of claim 1 wherein said bridge member includes a 135° bend positioned at the edges of the adjacent panels.

7. A pair of connector clamp assemblies for interconnecting at least four modular display channels comprising
   a pair of clamp bases each including a pair of angled members having first and second legs normal to each other, a bridge member integrally connected to the second leg of each angle member for bridging between the edges of adjacent panels;
   a clamp angle connected to each of the angle members of the pair of clamp bases, each clamp angle having corresponding first and second leg elements;
   said clamp angles being positioned to have said second leg element parallel to said second leg of the corresponding angle member to form a channel to receive the edge of a panel, and the first leg element of each clamp angle being in juxtaposition to the corresponding first leg; and
   adjustable fastener means connecting each of the first leg elements and the corresponding first leg, whereby the width of each channel may be varied to securely clamp the corresponding edge of the panel and thereby interconnect the panels, said pair of connector clamp assemblies being connected by placement of said first leg elements in juxtaposition and providing oppositely extending channels for clamping adjacent panels, whereby edge-to-edge positioning of at least four panels is provided.

* * * * *